(12) United States Patent
White et al.

(10) Patent No.: US 8,403,717 B1
(45) Date of Patent: Mar. 26, 2013

(54) EXHAUST SYSTEM FOR A MARINE VESSEL

(75) Inventors: Brian R. White, Stillwater, OK (US);
Terry D. Axton, Stillwater, OK (US);
Keith S. Ducotey, Stillwater, OK (US)

(73) Assignee: Brunswick Corporation, Lake Forest, IL (US)

( * ) Notice: Subject to any disclaimer, the term of this patent is extended or adjusted under 35 U.S.C. 154(b) by 198 days.

(21) Appl. No.: 12/862,522

(22) Filed: Aug. 24, 2010

(51) Int. Cl.
*F01N 3/04* (2006.01)
*B63H 21/00* (2006.01)
*B63B 35/73* (2006.01)

(52) U.S. Cl. .................... 440/89 B; 440/89 R; 440/89 E

(58) Field of Classification Search ................. 440/89 B
See application file for complete search history.

(56) References Cited

U.S. PATENT DOCUMENTS

| | | | |
|---|---|---|---|
| 3,552,121 A | 1/1971 | Kenichi Kitagawa et al. | |
| 4,831,822 A * | 5/1989 | Yoshimura | 60/310 |
| 5,616,893 A | 4/1997 | Woods | |
| 5,746,630 A * | 5/1998 | Ford et al. | 440/89 R |
| 6,152,258 A | 11/2000 | Deavers et al. | |
| 7,314,044 B2 * | 1/2008 | Westerbeke | 123/672 |
| 7,581,620 B2 | 9/2009 | Woods et al. | |

* cited by examiner

*Primary Examiner* — Daniel Venne
*Assistant Examiner* — Andrew Polay
(74) *Attorney, Agent, or Firm* — Andrus, Sceales, Starke & Sawall, LLP

(57) ABSTRACT

A marine propulsion system has an exhaust conduit conveying exhaust gases from an internal combustion engine. The exhaust conduit has a dry portion and a wet portion located downstream of the dry portion. Cooling fluid enters the exhaust conduit to cool exhaust gases flowing through the wet portion. A bypass conduit is connected to the exhaust conduit and conveys a portion of the cooling fluid away from the dry portion to thereby decrease reversion of cooling fluid into the dry portion.

15 Claims, 4 Drawing Sheets

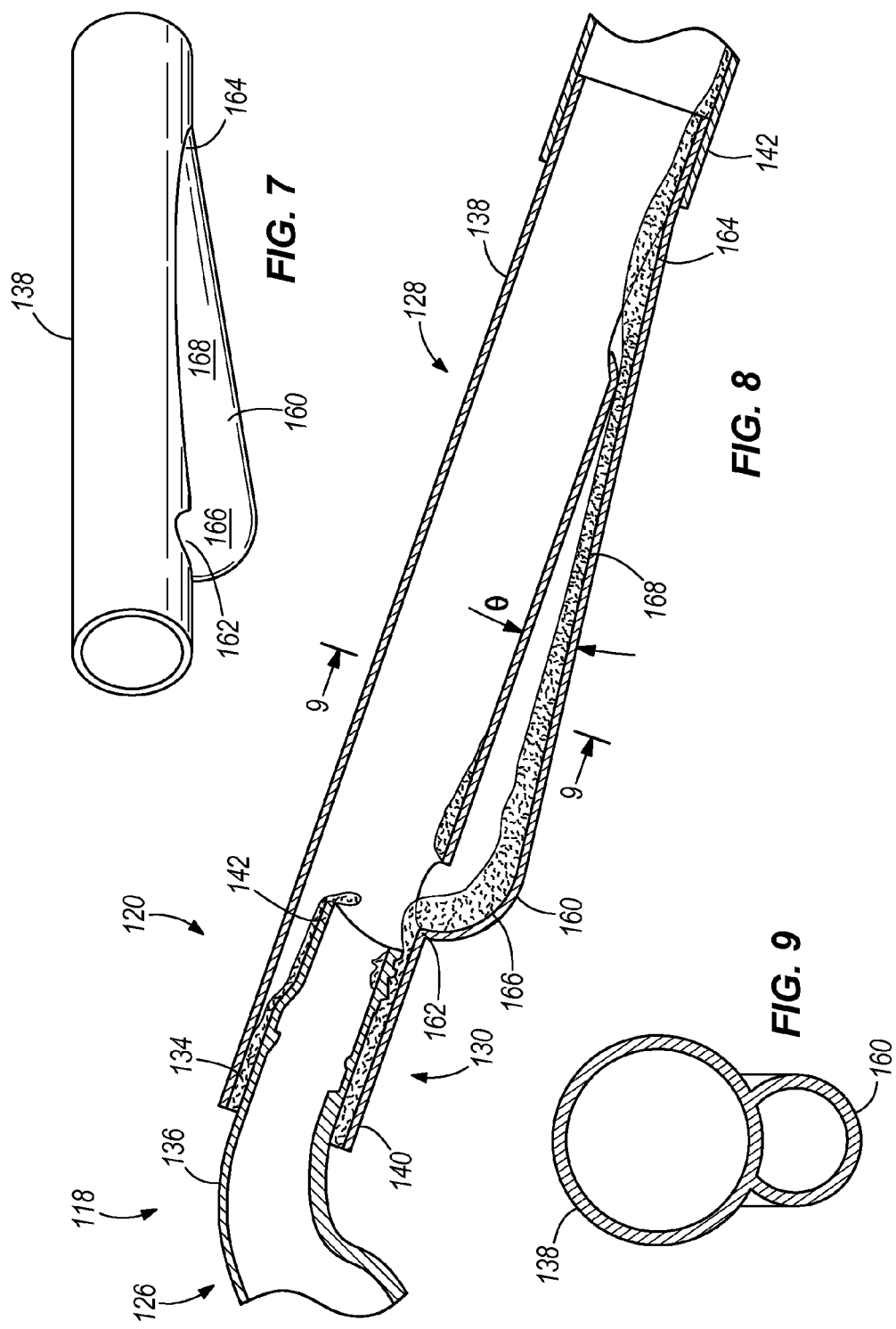

US 8,403,717 B1

EXHAUST SYSTEM FOR A MARINE VESSEL

FIELD AND BACKGROUND

This disclosure relates to propulsion systems for marine vessels.

Propulsion systems for marine vessels typically include an internal combustion engine having at least one exhaust conduit for conveying exhaust gases away from the engine. The present invention arose during continuing development efforts directed toward such systems.

SUMMARY

In one example, a marine propulsion system comprises an exhaust conduit conveying exhaust gases from an internal combustion engine. The exhaust conduit comprises a dry portion and a wet portion located downstream of the dry portion. Cooling fluid enters the exhaust conduit to cool exhaust gases flowing through the wet portion. A bypass conduit is connected to the exhaust conduit and conveys a portion of the cooling fluid away from the dry portion to thereby decrease reversion of cooling fluid into the dry portion.

In another example, in a marine propulsion system having an internal combustion engine, an exhaust system comprises an exhaust conduit discharging exhaust gases. The exhaust conduit receives cooling fluid for cooling exhaust gases in the exhaust conduit. A bypass conduit is connected to the exhaust conduit and conveys a portion of the cooling fluid away from the dry portion to thereby decrease reversion of cooling fluid into the dry portion.

In another example, a method of cooling exhaust gases in an exhaust system for a marine engine comprises cooling exhaust gases from the engine by dispersing cooling fluid into an exhaust conduit at a location downstream of a dry portion of the exhaust conduit and upstream of a wet portion of the exhaust conduit and draining cooling fluid from the exhaust conduit to decrease reversion of cooling fluid into the dry portion.

BRIEF DESCRIPTION OF THE DRAWINGS

FIG. 7 is a perspective view of a fourth example of an exhaust conduit for conveying exhaust gases away from an internal combustion engine.

FIG. 8 is a view of the embodiment shown in FIG. 7.

FIG. 9 is a view of section 9-9 taken in FIG. 8.

DETAILED DESCRIPTION OF THE DRAWINGS

In the present description, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. §112, sixth paragraph only if the terms "means for" or "step for" are explicitly recited in the respective limitation.

Figure 1:
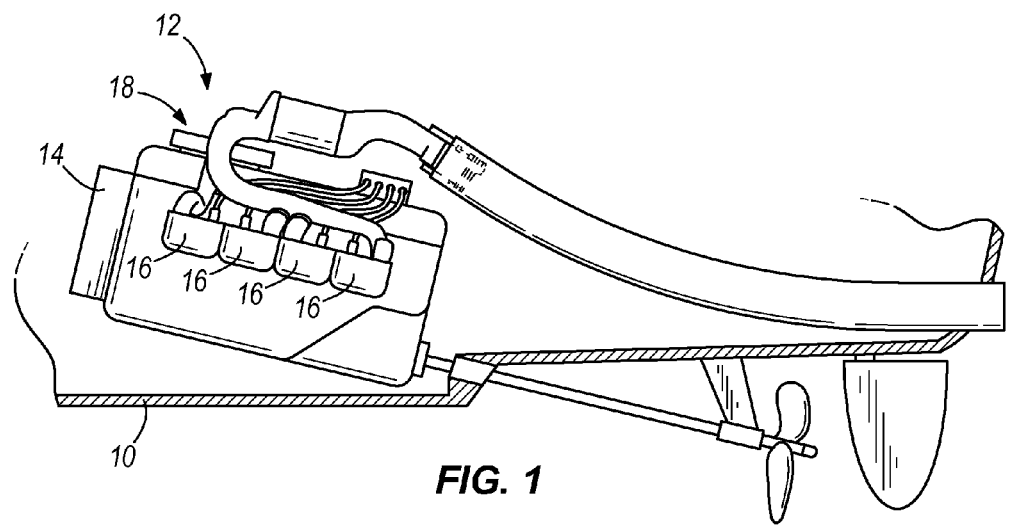
FIG. 1 is a partial schematic view of a marine vessel having a marine propulsion system.

For descriptive purposes, FIG. 1 depicts a certain type of marine vessel 10 having a certain type of marine propulsion system 12 including an inboard-mounted internal combustion engine 14. It should however be recognized that the present invention is not limited for use with the particular marine vessel and marine propulsion system shown and described. Rather, the invention can be implemented in a wide variety of marine vessels having any number of marine propulsion systems and any type of mounting arrangement for such systems, including outboard, stern drive, pod drive and the like. The particular engine shown in FIG. 1 is an eight cylinder engine; however the invention is not limited for use with this particular type of engine. The engine 14 shown in FIG. 1 has a plurality of exhaust ports 16 discharging exhaust gases during operation of the engine 14. Again however, the number and arrangement of exhaust ports 16 can vary and this invention is not limited to the particular arrangement of exhaust ports shown and described.

Figure 2:
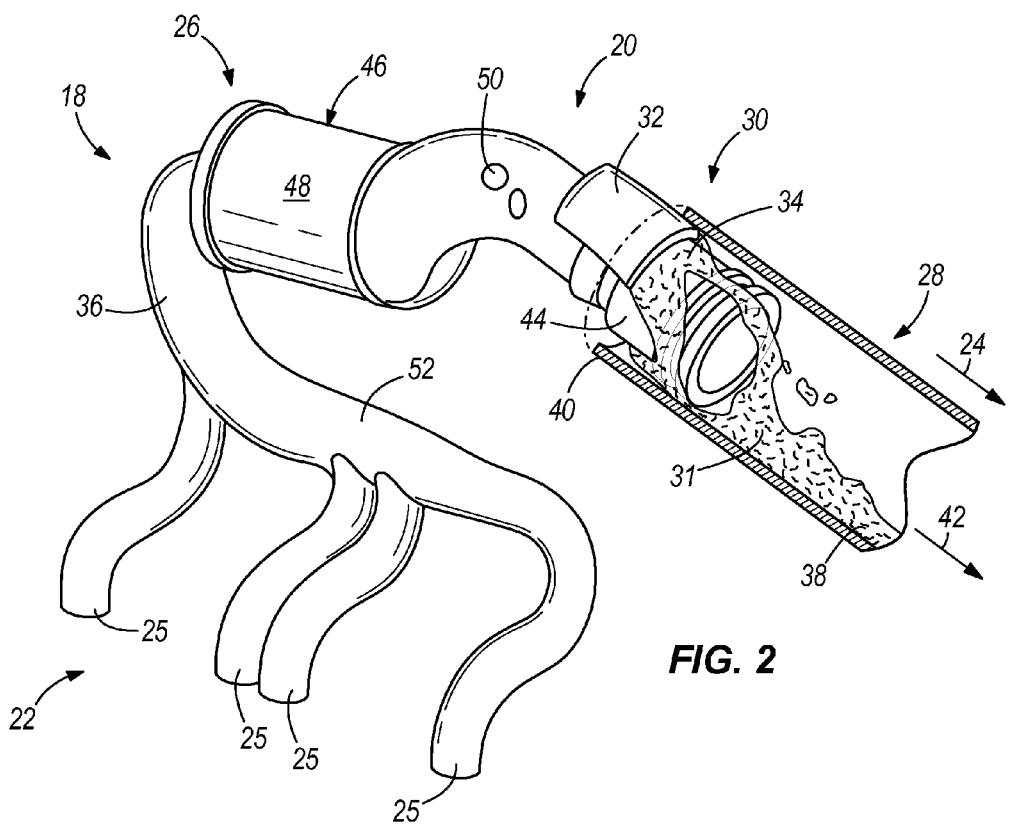
FIG. 2 is a perspective view of an exhaust conduit for conveying exhaust gases away from an internal combustion engine.

As shown in FIG. 2, an exhaust system 18 is connected to the exhaust ports 16 and includes an exhaust conduit 20 extending from an upstream location 22 receiving exhaust from the engine 14 via ports 16 to a downstream location 24 discharging exhaust gases outside of the marine vessel 10. The exhaust conduit 20 includes a dry portion 26, a wet portion 28, and a transition portion 30 located between the dry portion 26 and the wet portion 28. A cooling jacket 32 which is only partially shown in FIG. 2 surrounds the dry portion 26 of the exhaust conduit 20 and contains and facilitates flow of cooling fluid 34, such as for example water or other fluid, including liquid, gases, combinations thereof, and the like, adjacent the dry portion 26 of exhaust conduit 20 to thereby facilitate exchange of heat between the exhaust gases flowing through the dry portion 26 and the cooling fluid 34, thus cooling the relatively hot exhaust gases to a desired temperature. The cooling jacket 32 is not an essential element and could be eliminated from the system 18.

As shown in FIG. 2, the cooling fluid 34 enters the exhaust conduit 20 at the transition portion 30 and mixes with and further cools exhaust gases flowing through the wet portion 28. In the example shown, the exhaust gases and cooling fluid 34 flow from upstream to downstream along the wet portion 28 of exhaust conduit 20. A portion of the cooling fluid 34 settles by gravity at the bottom of the wet portion 28. This aspect will be further discussed hereinbelow.

As shown in FIG. 2, the exhaust conduit 20 includes an upstream tubular member 36 and a downstream tubular member 38. The downstream tubular member 38 is a substantially straight tubular cylinder; however, it could have other shapes and cross-section, including both uniform and non-uniform shapes along its length. The downstream tubular member 38 includes an inlet end 40 and an outlet end 42. The wet portion 28 is located between the inlet end 40 and outlet end 42. The upstream tubular member 36 includes a plurality of inlet ends 25 located adjacent the exhaust ports 16 and an outlet end 44. The dry portion 26 is located between the inlet ends 25 and outlet end 44 and includes a catalyst portion 46 containing a catalyst 48 for catalyzing exhaust gases flowing through the exhaust conduit 20. At least one oxygen sensor 50 is located in the dry portion 26 at a location downstream of the catalyst portion 46 and upstream of the transition portion 30. Additional sensors can be located at other locations in the exhaust conduit 20, such as upstream of the catalyst 48. Upstream of the catalyst portion 46 is a manifold 52 for receiving and merging exhaust gases flowing from the exhaust ports 16 of the engine 14.

In the example shown, the inlet end 40 of the downstream tubular member 38 overlaps with the outlet end 44 of the upstream tubular member 36. At this location of overlap, cooling fluid flowing between the cooling jacket 32 and dry portion 26 of the exhaust conduit 20 is discharged to the transition portion 30 of the exhaust conduit 20. It should be recognized that different configurations for the transition portion 30 could be employed and the invention is not limited to the particular arrangement shown. For example, upstream and downstream tubular members 36, 38 do not have to overlap with each other and can be of the same or substantially different diameter.

Flow of exhaust gases through the conduit 20 typically is not a continuous or uniform stream, but rather may flow according to pulsations based upon factors such as movement of cylinders in the engine 14, temperature of the components of the system 18, and various other characteristics of the exhaust gases and system 18. During testing of the system depicted in FIG. 2, the present inventors discovered that when certain volumes of exhaust gases flow through the conduit 20, pulsations in the exhaust gases cause backward movement or reversion thereof which causes cooling fluids 34 to collect at or near the transition portion 30, such as is shown at location 31. Non-uniform flow of exhaust gases also draws cooling fluid 34 backwards from the transition portion 30 into the outlet 44 and into what otherwise is desired to be the dry portion 26 of the exhaust conduit 20. Such reversive travel of cooling fluid 34 interferes with normal operations of the exhaust system 18, such as operations of the oxygen sensor 50, operations of the catalyst 48, etc. Through testing, the inventors discovered that in the arrangement of FIG. 2, amounts of cooling fluid 34 collect near the location 31 shown in FIG. 2, resulting in collection of cooling fluid 34 at the transition portion 30, proximate the outlet end 42 of the upstream tubular member 36. Upon this discovery, the present inventors constructed and then tested the alternative embodiments depicted in FIGS. 3-6.

Figure 3:
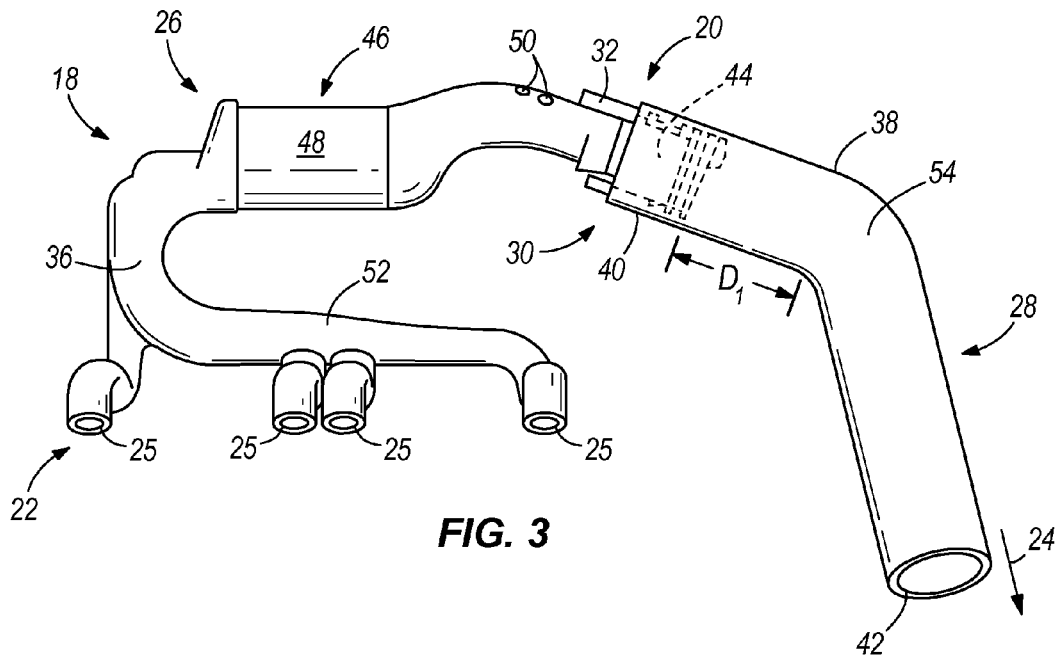
FIG. 3 is a perspective view of a second example of an exhaust conduit for conveying exhaust gases away from an internal combustion engine.
Figure 4:
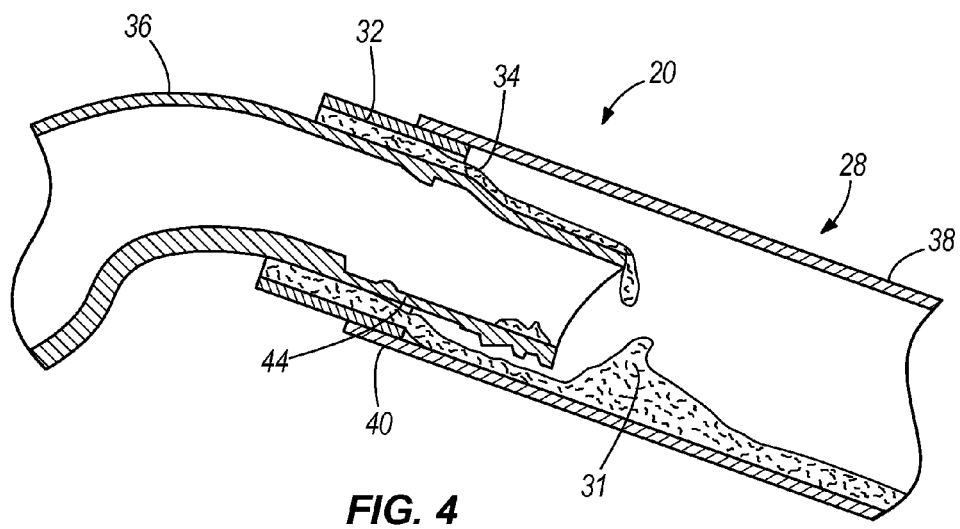
FIG. 4 is a sectional view of the exhaust conduit in FIG. 3.

FIGS. 3 and 4 depict an alternate embodiment of the exhaust system 18 constructed by the inventors to assess the above-noted reversion characteristics of cooling fluid 34 in the exhaust system 20. In this embodiment the inventors introduced a particular S-pipe configuration for the downstream tubular member 38, which includes a bended portion 54 located a certain distance $D_1$ downstream of the outlet end 44 of the upstream tubular member 36. As shown in the profile view of FIG. 4, the inventors determined that collection and reversion of cooling fluid 34 in the conduit 20 was not substantially decreased in comparison to the embodiment of FIG. 2.

Figure 5:
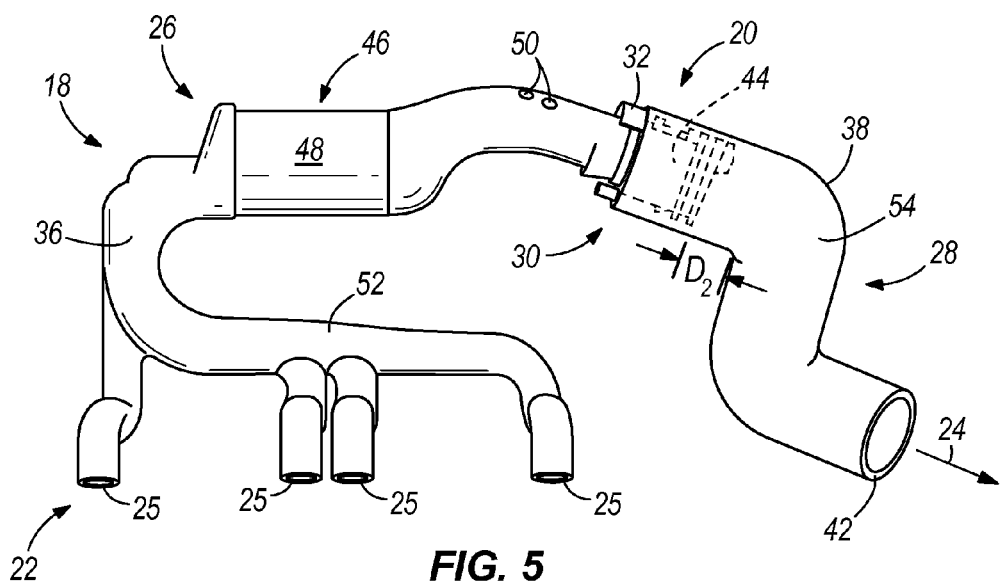
FIG. 5 is a perspective view of a third example of an exhaust conduit for conveying exhaust gases away from an internal combustion engine.
Figure 6:
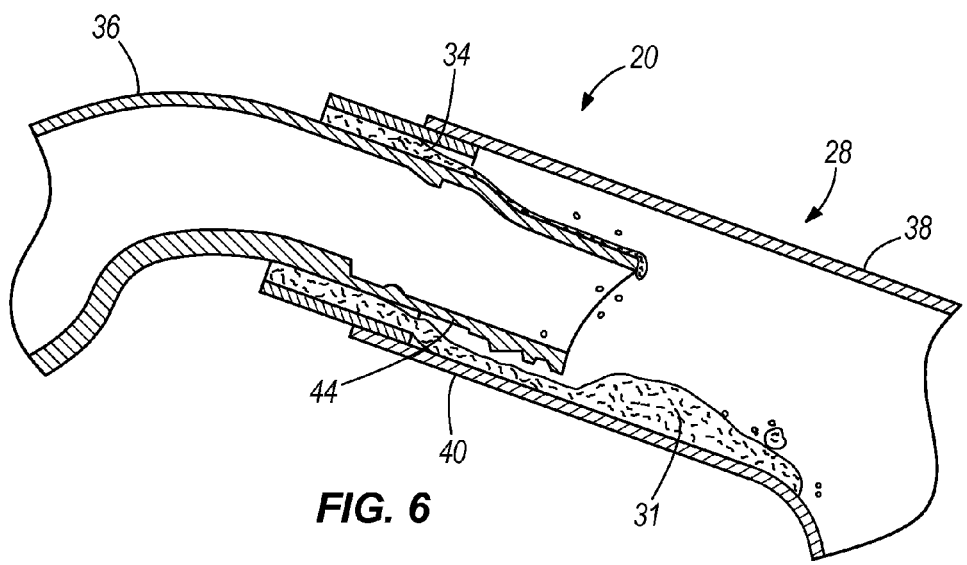
FIG. 6 is a sectional view of the exhaust conduit in FIG. 5.

FIGS. 5 and 6 depict another alternate configuration of the exhaust system 18 employed by the inventors to assess the newly discovered reversion characteristics of cooling fluid 34. In this embodiment the inventors introduced another S pipe configuration for the downstream tubular member 38, which includes a bended portion 54 located a certain distance $D_2$ downstream of the outlet end 44, which distance $D_2$ is less than the distance $D_1$. As shown in the profile view of FIG. 6, the inventors found that placement of the bended portion 54 at a location closer to the outlet end 44 of the upstream tubular member 36 resulted in a decrease in the collection of cooling fluid 34, thus advantageously preventing some of the disadvantages discussed above regarding reversion of cooling fluid 34.

However, the alternate configuration of FIGS. 5 and 6 cannot provide a solution to the above-noted water reversion problems for many marine propulsion systems 12. This is because it is often desirable to have a dry portion 26 of exhaust conduit 20 that is a substantially straight tubular cylinder to for example facilitate positioning of the exhaust system 18 within the overall marine propulsion system 12 and the marine vessel 10. The particular S pipe configuration depicted in FIGS. 4 and 5 was found by the inventors to be inadequate for many of these situations.

Referring to FIGS. 7-9, the present inventors invented an exhaust system 118 to overcome the problems and disadvantages discussed in reference to the embodiments described herein above. The exhaust system 118 includes an exhaust conduit 120 conveying exhaust gases from an internal combustion engine 14. The exhaust conduit 120 includes a dry portion 126 and a wet portion 128 located downstream of the dry portion 126. Cooling fluid 134 enters the exhaust conduit 120 to cool exhaust gases flowing through the wet portion 128. In the example shown, the wet portion 128 is advantageously a substantially straight tubular cylinder.

The exhaust conduit 120 includes an upstream tubular member 136 and a downstream tubular member 138, which includes the substantially straight tubular cylinder. The downstream tubular member 138 includes an inlet end 140 and an outlet end 142. The wet portion 128 is located between the inlet end 140 and outlet end 142.

The exhaust conduit 120 also includes a transition portion 130 located between the dry portion 126 and the wet portion 128. The outlet end 142 of the upstream tubular member 136 is in communication with the inlet end 140 of the downstream tubular member 138 at the transition portion 130. In the example shown, the inlet end 140 of the downstream tubular member 138 overlaps with the outlet end 144 of the upstream tubular member 136 at the transition portion 130.

Similar to the examples of FIGS. 2-6, a cooling jacket 32 is optional and provided for conveying cooling fluid 134 outside of the upstream tubular member 136 and inside of the cooling jacket 32. The cooling jacket 32 discharges cooling fluid 134 to the exhaust conduit 120.

The system 18 further includes a bypass conduit 160 connected to the exhaust conduit 120 and conveying a portion of the cooling fluid 134 away from the dry portion 126 to thereby decrease reversion of cooling fluid 134 in the dry portion 126. In the example shown, the bypass conduit 160 conveys the portion of cooling fluid 134 from the transition portion 130 to the wet portion 128. The bypass conduit 160 includes an inlet end 162 connected to the transition portion 130 and receiving the portion of cooling fluid 134 from the exhaust conduit 120 and an outlet end 164 connected to the wet portion 128 and discharging the portion of cooling fluid 134 to the exhaust conduit 120. The bypass 160 further has a first portion 166 extending generally perpendicularly from the inlet end 162 relative to the exhaust conduit 120 and a second portion 168 extending generally transversely and at an acute angle, Θ, relative to the exhaust conduit 120 tubular member 138. In this example, the inlet end 162 receives the portion of cooling fluid 134 at least partially by gravity flow. Although the embodiment shown in FIGS. 7-9 shows the inlet end 162 connected to the transition portion 130 in a particular configuration, the inlet end 162 could alternately be located elsewhere, such as upstream of the transition portion 130.

During operation, exhaust gases from the engine 14 are cooled by dispersing the cooling fluid 134 into the exhaust conduit 120 at the depicted location downstream of the dry portion 126 of the exhaust conduit 120 and upstream of the wet portion 128 of the exhaust conduit 120. The bypass conduit 160 facilitates draining of a portion of the cooling fluid 134 from the exhaust conduit 120 to thereby decrease reversion of cooling fluid 134 into the dry portion 126.

The step of draining cooling fluid 134 facilitates sensing of at least one characteristic of the exhaust gases at the location of oxygen sensor 50 by preventing reversion of cooling fluid 134 into the location of such sensing.

In the example shown, the bypass conduit 160 has a circular cross-section and is generally tubular in shape. However, alternate cross-sections and sizes of the respective first portion 166 and second portion 168 are contemplated.

What is claimed is:

1. A marine propulsion system comprising an exhaust conduit conveying exhaust gases from an internal combustion engine, the exhaust conduit comprising a dry portion and a wet portion located downstream of the dry portion, wherein cooling fluid enters the exhaust conduit to cool exhaust gases flowing through the wet portion, and further comprising a bypass conduit connected to the exhaust conduit and conveying a portion of the cooling fluid away from the exhaust conduit;
   wherein the exhaust conduit comprises a transition portion located between the dry portion and the wet portion, wherein the bypass conduit conveys the portion of cooling fluid from the transition portion to the wet portion;
   where the bypass conduit comprises an inlet end connected to the transition portion, the inlet end receiving the portion of cooling fluid from the exhaust conduit, and where the bypass conduit further comprises an outlet end connected to the wet portion, the outlet end discharging the portion of cooling fluid back into the exhaust conduit;
   wherein the bypass conduit has a first portion extending generally perpendicularly from the inlet end relative to the exhaust conduit and a second portion extending transversely and at an acute angle relative to the exhaust conduit.

2. A marine propulsion system according to claim 1, wherein the wet portion is a substantially straight tubular cylinder.

3. A marine propulsion system according to claim 1, wherein the exhaust conduit comprises a transition portion located between the dry portion and the wet portion, wherein the bypass conduit conveys the portion of cooling fluid from the transition portion to the wet portion.

4. A marine propulsion system according to claim 3, where the bypass conduit comprises an inlet end connected to the transition portion, the inlet end receiving the portion of cooling fluid from the exhaust conduit, and where the bypass conduit further comprises an outlet end connected to the wet portion, the outlet end discharging the portion of cooling fluid back into the exhaust conduit.

5. A marine propulsion system according to claim 1, wherein the inlet end receives the portion of cooling fluid at least partially by gravity flow.

6. A marine propulsion system according to claim 1, wherein the dry portion comprises a manifold for receiving exhaust gases from a plurality of exhaust ports of the internal combustion engine.

7. A marine propulsion system according to claim 1, comprising a catalyst portion located in the dry portion for catalyzing exhaust gases flowing through the dry portion.

8. A marine propulsion system according to claim 1, comprising at least one oxygen sensor disposed in the dry portion at a location downstream of the catalyst portion and upstream of the wet portion.

9. A marine propulsion system according to claim 1, comprising an internal combustion engine.

10. An exhaust system for a marine propulsion system having an internal combustion engine, the exhaust system comprising:
    an elongated exhaust conduit having an upstream dry portion receiving exhaust gases from the internal combustion engine, a downstream wet portion discharging the exhaust gases, and a transition portion located between the upstream dry portion and the downstream wet portion, the transition portion receiving cooling fluid for mixing with and cooling exhaust gases in the wet portion;
    a catalyst disposed in the upstream dry portion; and
    a bypass conduit connected to the exhaust conduit at a location downstream of the catalyst, the bypass conduit draining a portion of the cooling fluid from the exhaust conduit, the bypass conduit being positioned with respect to the transition portion so that the portion of the cooling fluid that is drained into the bypass conduit bypasses part of the wet portion to thereby prevent the portion of the cooling fluid that is drained into in the bypass conduit from reverting in the exhaust conduit towards the catalyst;
    wherein the portion of the cooling fluid in the bypass conduit is conveyed in parallel with a remaining portion of the cooling fluid in the wet portion.

11. An exhaust system according to claim 10, wherein the bypass conduit has an inlet end connected to the transition portion and an outlet end connected to the wet portion downstream of where the transition portion is joined to the wet portion.

12. An exhaust system according to claim 11, wherein the bypass conduit has a first portion extending transversely to the exhaust conduit and a second portion extending transversely to the first portion and at an acute angle to the wet portion.

13. An exhaust system according to claim 10, comprising at least one oxygen sensor disposed in the dry portion at a location downstream of the catalyst.

14. An exhaust system for a marine propulsion system having an internal combustion engine, the exhaust system comprising:
    an elongated exhaust conduit having an upstream dry portion receiving exhaust gases from the internal combustion engine, a downstream wet portion discharging the exhaust gases, and a transition portion located between the upstream dry portion and the downstream wet portion, the transition portion receiving cooling fluid for mixing with and cooling exhaust gases in the wet portion;
    a catalyst disposed in the upstream dry portion; and
    a bypass conduit connected to the exhaust conduit at a location downstream of the catalyst, the bypass conduit draining a portion of the cooling fluid from the exhaust conduit, the bypass conduit being positioned with respect to the transition portion so that the portion of the cooling fluid that is drained into the bypass conduit bypasses part of the wet portion to thereby prevent the portion of the cooling fluid that is drained into in the bypass conduit from reverting in the exhaust conduit towards the catalyst;

wherein the dry portion comprises an upstream tubular conduit, wherein the wet portion comprises a downstream tubular conduit; and wherein the downstream tubular conduit physically overlaps with the upstream tubular conduit at the transition portion and wherein the cooling water enters the transition portion between the overlapped upstream and downstream tubular conduits.

15. An exhaust system according to claim 14, wherein the bypass conduit has an inlet end connected to the transition portion at a location downstream of an overlapping portion of the upstream and downstream tubular conduits.

* * * * *